June 4, 1929.  G. A. GILLEN  1,715,751
CUSHION WHEEL
Filed April 13, 1926
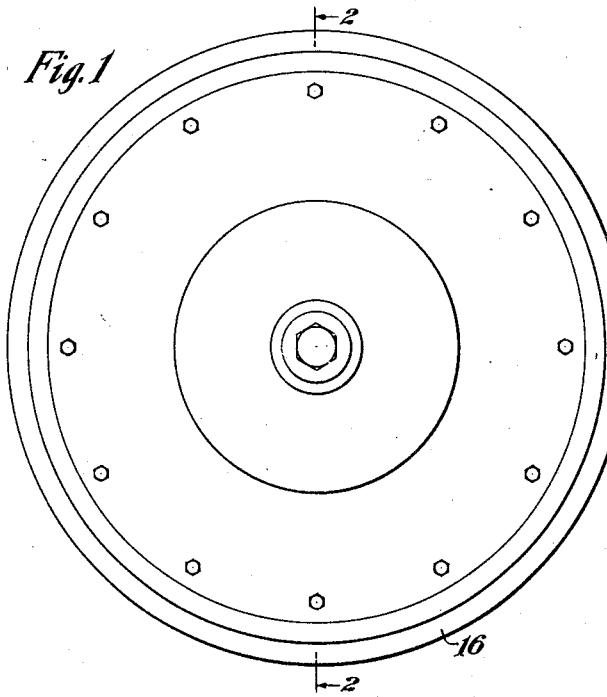
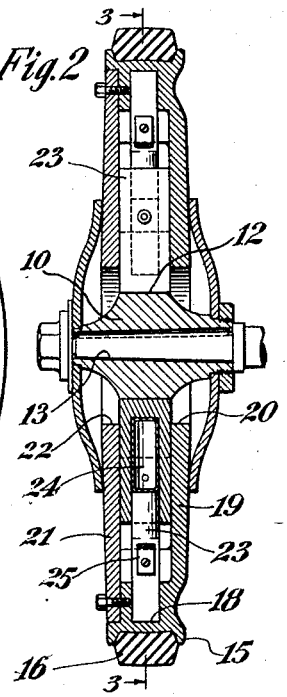
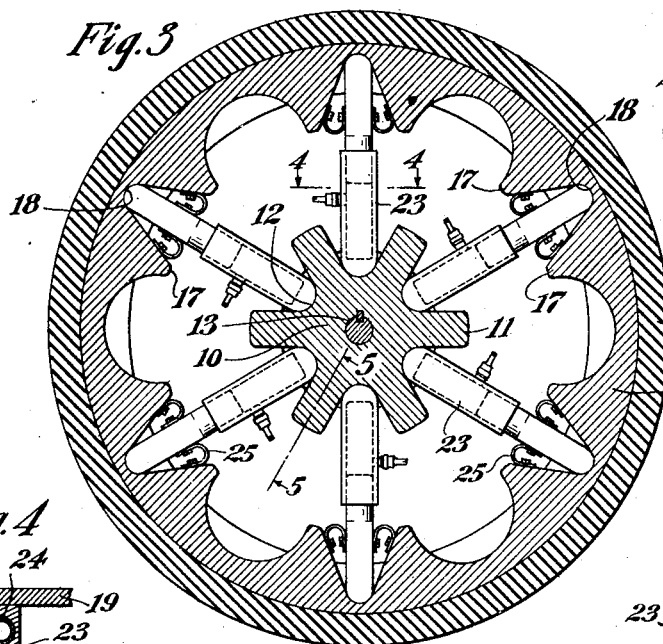
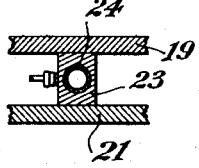
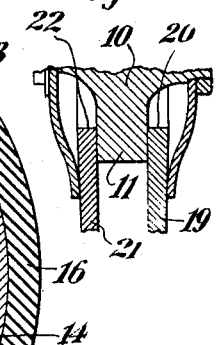
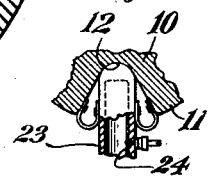
Inventor:
George A. Gillen Patented June 4, 1929.

1,715,751

UNITED STATES PATENT OFFICE.

GEORGE A. GILLEN, OF JERSEY CITY, NEW JERSEY, ASSIGNOR TO GILLEN LABORATORIES CORPORATION, OF NEW YORK, N. Y., A CORPORATION OF DELAWARE.

CUSHION WHEEL.

Application filed April 13, 1926. Serial No. 101,676.

This invention relates to improvements in cushion wheels, and more particularly to wheels such as are used on motor driven vehicles and the like.

The primary object of the invention is to improve the riding qualities of the vehicle, and to promote the comfort of the passengers without using the ordinary type of pneumatic tire.

Another object of the invention is to eliminate blow-outs and other disadvantages usually accompanying the use of wheels equipped with the customary pneumatic tires, and to substitute for such tires what are commonly termed, solid tires, without in any way detracting from the resiliency of the wheel.

A still further object of the invention is to enhance the appearance of a vehicle and yet maintain all of the advantages ordinarily secured by the use of wheels equipped with pneumatic tires.

One feature of the invention resides in the provision of telescopic spokes supported on independent cushions which, when a depression or rough place is encountered in the surface being traversed, will effectively take up and absorb any vibration created thereby before it can be transmitted to the axle and chassis of the vehicle.

Another feature of the invention is the mounting of the telescopic spokes which enables any one of the spokes to be removed without interfering with the remainder of the wheel and at the same time producing the neat appearance of the disc wheel now in popular use.

A further feature of the invention is the provision of cushioning elements between the spokes and certain portions of the rim which take up and absorb the initial impulse and usual shock ordinarily experienced when starting a vehicle equipped with cushion wheels.

Briefly, the invention consists in an improvement in the cushion wheel described in my Patent No. 1,485,977, issued March 4, 1924, and comprises a hub portion and a rim portion which are spaced from each other and wholly independent. The hub is provided with a plurality of radially disposed arms forming pockets in which the inner ends of the telescopic spokes are seated. The outer ends of the spokes seat in similar pockets formed between inwardly extending radial partitions formed on the inner side of the rim and these telescopic spokes are provided intermediate their ends with cushioning devices such as springs, inflatable rubber sacks or the like. In order to retain the spokes in proper relation and avoid side sway the rim is provided on one side with a rigid inwardly extending flange and on its opposite side with a detachable plate or ring which extends inwardly to a point near the hub. In order to secure motion between the hub and rim it is necessary that the openings in the flange and plate be relatively large, and to exclude dust and dirt from the interior of the wheel and also to improve the appearance of the device it is desired that cover plates be attached to opposite sides of the hub in any desired manner.

The above objects and features will be more clearly understood by reference to the following specification and accompanying drawing, in which Fig. 1 is a side view of a wheel constructed in accordance with this invention, Fig. 2 is a vertical sectional view taken on line 2—2 of Fig. 1, Fig. 3 is a vertical sectional view taken on line 3—3 of Fig. 2, Fig. 4 is a sectional view taken on line 4—4 of Fig. 3, Fig. 5 is a sectional view taken on line 5—5 of Fig. 3, and Fig. 6 is a fragmentary sectional view through the hub showing a modified form of the device.

Referring to the drawings in detail, the hub is designated by the numeral 10 and comprises a body formed with a plurality of radiating arms 11 which form a plurality of pockets 12 having curved bottom walls and divergent side walls, as clearly shown in the drawings. The hub is provided with the usual axle receiving opening 13.

The rim 14 is provided at opposite side edges with outwardly extending flanges 15, between which the tire 16 is retained. Extending inwardly from the inner face of the rim at spaced intervals are arms 17, forming pockets 18, which like the pockets 12 are rounded at their inner ends to form bearing surfaces and are provided with divergent side walls. Extending inwardly from the rim is a flange 19 which is provided with a central opening 20 of relatively large proportions to accommodate the hub and associated elements and to permit free motion of said hub with relation to the rim. A plate 21 is removably secured to the opposite side of the wheel and like the flange 19 is provided with an opening 22, which aligns with the opening 20 for a similar purpose.

Seated in the pockets 12 and 18 are opposite ends of telescopic spokes 23. These spokes are rounded at their ends to rock freely against the bottom walls of the pockets and are provided intermediate their ends with cushion elements such as inflatable sacks 24, each of which is provided with a valve stem through which air under pressure may be introduced. It is to be understood, however, that any form of cushion may be substituted which will lend itself readily to variation of its action so that in actual use only a limited number of sizes of wheels need be produced, in order to readily adapt them to vehicles of varying weights.

In order to provide for easy starting when the device is used as one of the propulsion wheels, and to prevent shocks and undesirable vibrations from being created upon starting, cushions such as bowed springs 25 are interposed between the spokes and the arms 17 so as to take up and yieldably transmit rotary motion between the hub and the spokes, and the rim.

In use it will be apparent that upon starting a vehicle wherein all wheels, including the drivers, are constructed in accordance with this invention, the initial impact of the divergent walls of the pockets 12 against the spokes will tend to rotate the wheel as a unit, thereby transmitting rotary motion to the rim through the springs 25 and setting the vehicle in motion. Upon encountering rough and uneven places in the roadway or surface traversed, it will be apparent that the spokes are free to telescope against their respective cushions and will effectively absorb road shocks and vibrations without transmitting the same to the springs and chassis of the vehicle. Obviously, much wear and disintegration due to vibration will be overcome and, should one of the spokes become inoperative, serious interruption of the progress of the vehicle need not be experienced as a new spoke element may be readily inserted, or in case of absolute necessity, the wheel may still be used without further attention.

While in the foregoing there has been shown and described the preferred embodiment of this invention, it is understood that changes may be made in the details of construction, combination and arrangement of parts without departing from the spirit and scope of the invention, as claimed.

What is claimed is:

A wheel comprising a hub having peripheral pockets therein, the end walls of which are divergent, a rim having pockets therein, the end walls of which are divergent, compressible spokes between the hub and rim, the ends of the spokes seating in the pockets, and cushion springs between the spokes and the divergent walls of the pockets in the rim.

In witness whereof, I, GEORGE A. GILLEN, hereunto subscribe my name this 3rd day of April, A. D., 1926.

GEORGE A. GILLEN.